(12) United States Patent
Wolfson et al.

(10) Patent No.: US 11,561,851 B2
(45) Date of Patent: *Jan. 24, 2023

(54) DATACENTER IOT-TRIGGERED PREEMPTIVE MEASURES USING MACHINE LEARNING

(71) Applicant: EMC IP Holding Company LLC, Hopkinton, MA (US)

(72) Inventors: Kfir Wolfson, Beer Sheva (IL); Jehuda Shemer, Kfar Saba (IL); Assaf Natanzon, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/382,065

(22) Filed: Jul. 21, 2021

(65) Prior Publication Data

US 2021/0349776 A1 Nov. 11, 2021

Related U.S. Application Data

(63) Continuation of application No. 16/156,832, filed on Oct. 10, 2018, now Pat. No. 11,106,528.

(51) Int. Cl.
*G06F 11/00* (2006.01)
*G06F 11/07* (2006.01)
(Continued)

(52) U.S. Cl.
CPC ........ *G06F 11/0793* (2013.01); *G06F 11/079* (2013.01); *G06F 11/0709* (2013.01);
(Continued)

(58) Field of Classification Search
CPC ............ G06F 11/0793; G06F 11/0709; G06F 11/0751; G06F 11/079; G06F 21/56; G06Q 10/06315
See application file for complete search history.

(56) References Cited

U.S. PATENT DOCUMENTS 7,991,961 B1 8/2011 Tsai et al.
8,285,879 B2 10/2012 Cheifot et al.
(Continued)

OTHER PUBLICATIONS

U.S. Application Filed on Jul. 10, 2018, by Kfir Wolfson et al., U.S. Appl. No. 16/031,936.
(Continued)

*Primary Examiner* — Loan L. T. Truong
(74) *Attorney, Agent, or Firm* — Workman Nydegger

(57) ABSTRACT

One example method includes performing a machine learning process that involves performing an assessment of a state of a computing system, and the assessment includes analyzing information generated by an IoT edge sensor in response to a sensed physical condition in the computing system, and identifying an entity in the computing system potentially impacted by an event associated with the physical condition. The example method further includes identifying a preemptive recovery action and associating the preemptive recovery action with an entity, and the preemptive recovery action, when performed, reduces or eliminates an impact of the event on the entity, determining a cost associated with implementation of the preemptive recovery action, evaluating the cost associated with the preemptive recovery actions and identifying the preemptive recovery action with the lowest associated cost, implementing the preemptive recovery action with the lowest associated cost, and repeating part of the machine learning process.

12 Claims, 4 Drawing Sheets

(51) Int. Cl.
   *G06Q 10/06* (2012.01)
   *G06N 20/00* (2019.01)
   *G06F 21/56* (2013.01)
(52) U.S. Cl.
   CPC ......... *G06F 11/0751* (2013.01); *G06N 20/00* (2019.01); *G06Q 10/06315* (2013.01); *G06F 21/56* (2013.01)

(56) References Cited

U.S. PATENT DOCUMENTS

| | | | |
|---|---|---|---|
| 8,707,107 | B1 | 4/2014 | Panna et al. |
| 9,440,747 | B1 | 9/2016 | Welsh et al. |
| 10,061,652 | B2 | 8/2018 | Johnson et al. |
| 10,134,437 | B2 | 11/2018 | Tsuboi et al. |
| 10,623,162 | B2 | 4/2020 | Bugenhagen et al. |
| 10,721,135 | B1 | 7/2020 | Delson et al. |
| 10,747,606 | B1* | 8/2020 | Shemer ................. G06F 11/079 |
| 10,936,395 | B1* | 3/2021 | Varma ................... G06F 11/079 |
| 10,970,174 | B2* | 4/2021 | McBride ............... G06F 11/2094 |
| 10,992,598 | B2 | 4/2021 | Grunwald et al. |
| 10,997,832 | B1 | 5/2021 | Vadayadiyil et al. |
| 11,392,435 | B2* | 7/2022 | Baldwin ............ G06F 11/0748 |
| 2002/0133681 | A1 | 9/2002 | McBrearty et al. |
| 2004/0193476 | A1* | 9/2004 | Aerdts ............... G06Q 30/0201 |
| | | | 705/7.29 |
| 2005/0216800 | A1 | 9/2005 | Bicknell et al. |
| 2006/0179343 | A1 | 8/2006 | Kitamura |
| 2007/0283192 | A1 | 12/2007 | Shevchenko |
| 2007/0288208 | A1 | 12/2007 | Grigsby et al. |
| 2009/0119541 | A1 | 5/2009 | Inoue et al. |
| 2010/0046553 | A1 | 2/2010 | Daigle et al. |
| 2011/0040703 | A1 | 2/2011 | Iqbal |
| 2011/0072253 | A1* | 3/2011 | Iqbal ................ G06Q 10/06375 |
| | | | 713/1 |
| 2011/0202735 | A1 | 8/2011 | Kono et al. |
| 2011/0302460 | A1 | 12/2011 | Idgunji et al. |
| 2012/0283971 | A1 | 11/2012 | Anderson et al. |
| 2013/0030990 | A1 | 1/2013 | Moore |
| 2013/0036324 | A1 | 2/2013 | Nagasawa |
| 2014/0068343 | A1* | 3/2014 | Nakajima ........... G06F 11/0793 |
| | | | 714/39 |
| 2014/0102013 | A1 | 4/2014 | Klink et al. |
| 2014/0309782 | A1 | 10/2014 | Sharpe et al. |
| 2014/0325262 | A1* | 10/2014 | Cooper ................. G06F 11/108 |
| | | | 714/6.22 |
| 2015/0113324 | A1* | 4/2015 | Factor ................ G06F 11/1662 |
| | | | 714/20 |
| 2015/0149837 | A1 | 5/2015 | Alonso et al. |
| 2015/0212909 | A1 | 7/2015 | Sporel |
| 2015/0254150 | A1 | 9/2015 | Gordon et al. |
| 2015/0372976 | A1 | 12/2015 | Lonas et al. |
| 2016/0004610 | A1 | 1/2016 | Knight |
| 2016/0092292 | A1 | 3/2016 | Lv et al. |
| 2016/0132397 | A1 | 5/2016 | Hui et al. |
| 2016/0275798 | A1 | 9/2016 | Maytal et al. |
| 2016/0330232 | A1 | 11/2016 | Kumar |
| 2016/0366220 | A1 | 12/2016 | Gottlieb et al. |
| 2016/0371316 | A1 | 12/2016 | Okanohara et al. |
| 2016/0378608 | A1 | 12/2016 | Kong et al. |
| 2017/0237752 | A1 | 8/2017 | Ganguly et al. |
| 2017/0242599 | A1 | 8/2017 | Patnaik et al. |
| 2018/0060159 | A1 | 3/2018 | Justin et al. |
| 2018/0139431 | A1 | 5/2018 | Simek et al. |
| 2018/0167306 | A1* | 6/2018 | Hsiao ..................... H04L 45/64 |
| 2018/0181091 | A1 | 6/2018 | Funk et al. |
| 2018/0253362 | A1 | 9/2018 | Reinecke et al. |
| 2018/0366792 | A1 | 12/2018 | Stachewicz et al. |
| 2018/0368007 | A1 | 12/2018 | Cummings |
| 2019/0013945 | A1 | 1/2019 | Hamlin et al. |
| 2019/0042114 | A1 | 2/2019 | Mesnier et al. |
| 2019/0080417 | A1 | 3/2019 | Amigo et al. |
| 2019/0171531 | A1* | 6/2019 | McBride ............. G06F 11/2097 |
| 2019/0171799 | A1 | 6/2019 | Crawford et al. |
| 2019/0188247 | A1 | 6/2019 | Weinreb et al. |
| 2019/0310620 | A1 | 10/2019 | Kamiguti et al. |
| 2019/0349426 | A1 | 11/2019 | Smith et al. |
| 2019/0361697 | A1 | 11/2019 | Hu et al. |
| 2019/0392328 | A1* | 12/2019 | Gil Bulacio ........... H04L 63/16 |
| 2020/0019455 | A1 | 1/2020 | Wolfson et al. |
| 2020/0019882 | A1 | 1/2020 | Garg et al. |
| 2020/0022016 | A1 | 1/2020 | Fenoglio et al. |
| 2020/0026786 | A1 | 1/2020 | Cadarette et al. |
| 2020/0034270 | A1 | 1/2020 | Desai et al. |
| 2020/0041316 | A1 | 2/2020 | Parush et al. |
| 2020/0050965 | A1 | 2/2020 | Harvill et al. |
| 2020/0059417 | A1 | 2/2020 | De Buitleir |
| 2020/0079403 | A1 | 3/2020 | Setiawan et al. |
| 2020/0159624 | A1* | 5/2020 | Malkov .................. G06N 20/00 |
| 2021/0064459 | A1 | 3/2021 | Ramasamy et al. |

OTHER PUBLICATIONS

U.S. patent Application filed on Oct. 10, 2018, by Wolfson et al., U.S. Appl. No. 16/156,832.

* cited by examiner

DATACENTER IOT-TRIGGERED PREEMPTIVE MEASURES USING MACHINE LEARNING

RELATED APPLICATIONS

This application is related to U.S. patent application Ser. No. 16/031,936, entitled DATACENTER PREEMPTIVE MEASURES FOR IMPROVING PROTECTION USING IOT SENSORS, filed Jul. 10, 2018. All of the aforementioned applications are incorporated herein in their respective entireties by this reference.

FIELD OF THE INVENTION

Embodiments of the present invention generally relate to data protection. More particularly, at least some embodiments of the invention relate to systems, hardware, software, computer-readable media, and methods directed to processes for using machine learning in connection with IoT-triggered preemptive measures in a datacenter.

BACKGROUND

Computing environments such as datacenters are faced with a range of different types of threats. These threats may concern not only physical devices, and software, but also the data itself, whether the data is already stored or in transit between computing systems.

With respect to data integrity, it may be the case that mission critical data and the most important information stored in the datacenter is being replicated to another location using a disaster recovery solution. However, the latest information sent to, or processed by, the applications may not yet have been replicated at the time a problem occurs, so some loss of critical data is to be expected for systems that employ asynchronous replication. Synchronous replication, on the other hand, presents problems of its own. Particularly, while synchronous replication may help to resolve the data loss problem associated with asynchronous replication, synchronous replication slows down the application by incurring latency and is not feasible to be used at all times and in all scenarios.

Some threats to data and computing systems such as datacenters occur in the physical realm. Particularly, while physical breaches of datacenters might be perceived to be somewhat less likely to occur, given the prevalence of cyberattacks, physical breaches such as retrieving information directly, or planting malicious software, nonetheless represent a significant threat to datacenters and the data stored there. For example, malware might compromise systems and data in any of a variety of ways, such as by collecting sensitive information for later physical retrieval, sending data to a remote location, altering the data in a malicious manner, or deleting the data.

Threats such as those noted can pose great liability and other legal issues to the company owning or operating the datacenter. This is true whether the data is owned by the company itself or by a third party that is hosted in the datacenter which belongs to service providing firm. The cost, legal and public relation penalties could be disastrous to the company.

Finally, some applications have an alternate location to failover to in case of problems with the production application location, but the time to failover (RTO) could be several to tens of minutes, depending on the complexity of the system. In many cases, this is unacceptably slow. Moreover, some modern applications, such as cloud-native 3rd platform applications, can constantly run in more than one location and have the ability to scale-out when needed. In case of downtime to one location, a management system will scale-out the computing resources in other locations and incoming application traffic will be diverted to these alternate locations instead of the failing site. However, this scale-out may take a long time and is not always automatic, resulting in downtime or reduced service level to application users. Thus, this scale-out approach is not effective in some circumstances.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
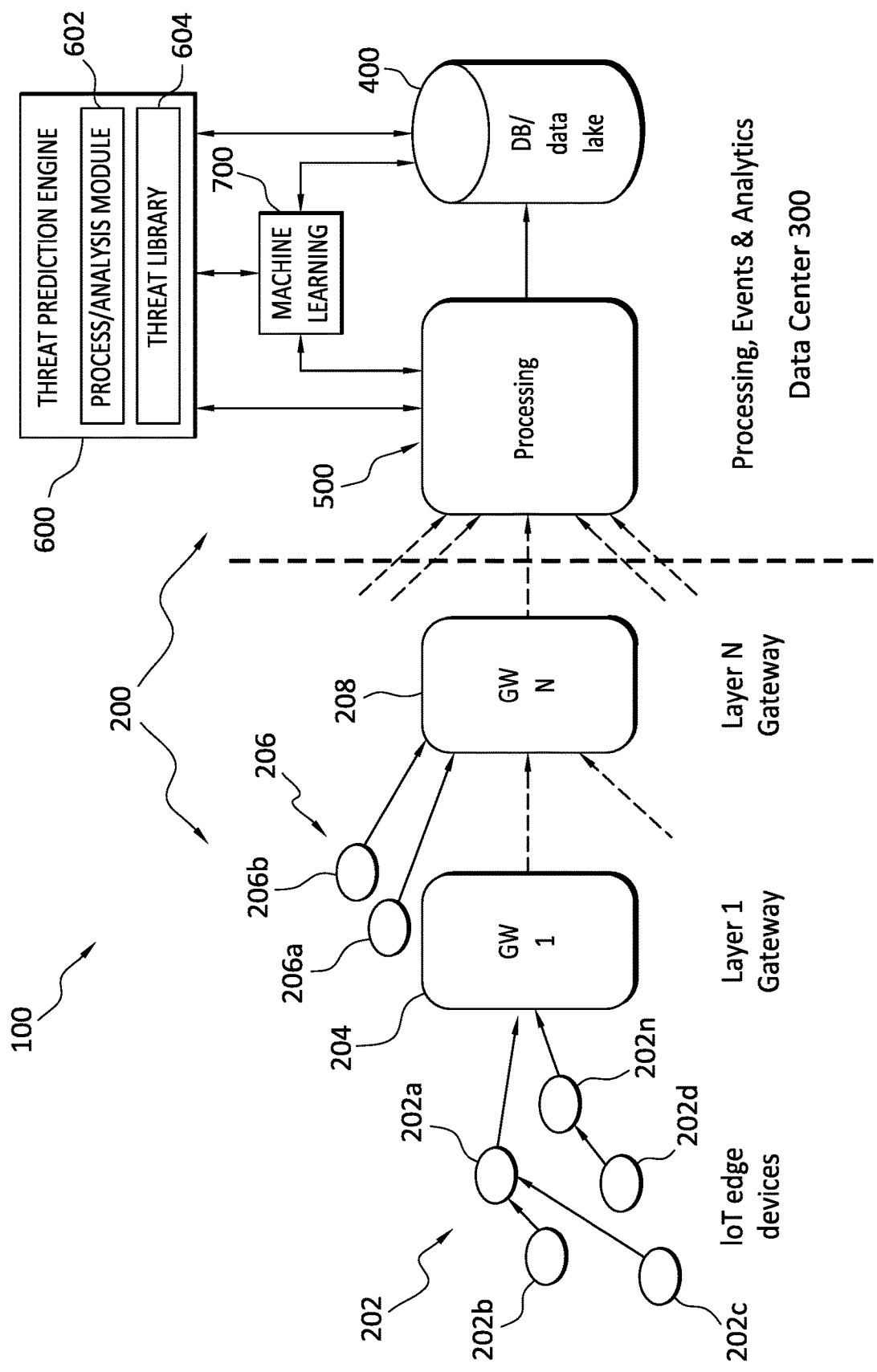
FIG. 1 discloses aspects of an example operating environment for some embodiments of the invention.

Embodiments of the present invention generally relate to data protection. More particularly, at least some embodiments of the invention relate to systems, hardware, software, computer-readable media, and methods directed to various processes performed in connection with a computing environment such as a data protection environment, including threat assessment, and implementation of preemptive measures relating to a threat. Some example embodiments are particularly concerned with the use of machine learning in connection with the implementation of IoT-triggered preemptive measures in a datacenter.

In at least some embodiments, a grid of Internet of Things (IoT) sensors is deployed that are configured and arranged to detect various threats to the datacenter and/or data stored in the datacenter. A backend service is also provided that is configured to communicate with the sensors, evaluate the threat or threats detected by the sensors, and provide for the implementation of one or more preemptive measures that are responsive to the detected threat and are calculated to mitigate, or eliminate, potential adverse impact of the threat on the datacenter and the data stored there. As used herein, datacenter is interpreted to embrace not only the datacenter hardware and software, but also the data stored at the datacenter.

In more detail, modern datacenters are the hub of every technological business, either on-premises, or in the cloud. Enterprise information technology (IT) departments employ various data protection paradigms to minimize downtime of production application. For example, data security and IT departments invest huge funds in discovering and blocking security breaches, detecting malicious software and fending off cyber-attacks. As well, physical security also plays an important role in protecting company and customer assets stored in the datacenter or mission critical applications running on its servers.

Security goals may be achieved, at least in part, through the use of IoT sensors for physical security and disaster detection. Surveillance cameras, motion detection sensors and other edge devices may be used to detect intruders and sound burglar alarms. Smoke and gas detectors may be used to trigger fire alarms and get distinguishers in action. Embodiments of the invention employ various threat-detecting IoT sensors inside or outside of a datacenter to trigger preemptive actions inside the datacenter itself, such as when a suspected threat is discovered. Additionally, or alternatively, data from the sensors and/or other sources may not automatically trigger a preemptive action, but will at least serve to cause an analysis of the sensor data, and such analysis may then indicate that one or more preemptive actions should be taken.

These actions will help maintain data integrity, business continuity and information security at the highest standard. In brief, datacenter management operations, data protection software(s) and IoT detection devices are connected into a single system that improves the overall protection that can be provided to the datacenter. This approach may reduce downtime and secure the information in the datacenter in case the threat is not mitigated before it begins to affect the datacenter itself. As used herein, preemptive actions embraces both actions that directly affect data associated with the datacenter, such as copying stored data to another location, as well as actions that may indirectly affect the stored data, such as increasing the flow of cool air to the datacenter in response to a nearby fire or other anomalous heat source. While the increased airflow rate does not directly impact the stored data itself, that airflow helps to protect the data by keeping the datacenter at an acceptable temperature, or within an acceptable temperature range.

For various reasons, it may be useful to revisit the preemptive actions that were taken in one or more cases, and their impact, in order to be able to refine a plan of action for taking preemptive measures in the future, and then implement the refined plan of action the next time a problem occurs, or is expected to occur. For example, the implementation of some preemptive actions may be expensive, and the results of the preemptive actions not always fully or accurately predictable. Thus, reassessment and refinement of the preemptive plan of action may help to identify how the process can be improved to provide, for example, more effective and efficient results, in terms of considerations such as system and application downtime, bandwidth usage, and cost. The reassessment and refinement may be performed iteratively as part of a machine learning process, and the machine learning process may employ data from actual events that have occurred and/or the machine learning process may be run using hypothetical data generated in connection with a model or simulation.

As the machine learning process progresses, the preemptive action plan or model may be continuously improved, and approach, or achieve, optimization. Thus, the machine learning process may comprise, or consist of, a closed loop feedback system for continuous improvement of the preemptive action plan.

Advantageously then, embodiments of the invention may provide various benefits. To illustrate, embodiments of the invention may improve and enhance the operation and reliability of computing systems such as datacenters by taking preemptive action before a detected threat condition actually begins to adversely affect the datacenter. In this way, loss of data and other problems relating to the datacenter can be mitigated, or possibly avoided altogether. As well, embodiments of the invention may be responsive to changing conditions. For example, if the nature of a threat should change, the preemptive actions initially planned to be taken may be cancelled, and alternative preemptive actions planned and taken. Likewise, if a threat fails to materialize for some reason, the preemptive actions may, as appropriate, be canceled, stopped, or reversed, for example. As a further example, various other inputs can be employed in determining whether and when to take a preemptive action, and in determining what the preemptive action should be. To illustrate, a confidence level that a particular threat will actually cause harm to the datacenter may be one input that plays a role in determining the response of the system to the detected threat. As a final example, embodiments of the invention may create and refine preemptive action plans based on real world, and/or simulated, data. The refined preemptive action plans may take into account past experience and other knowledge gained so that the refined preemptive action plan, when implemented, may produce relative improvements in various areas relating to the action(s) taken. Such improvements can be with respect to performance of the preemptive actions themselves, such as maximizing bandwidth utilization when transferring data to a remote node, and such improvements may additionally, or alternatively, be with respect to processes resulting from implementation of the preemptive actions, such as reducing application downtime incurred as a result of preemptive actions, and minimizing the financial cost associated with preemptive actions.

As the foregoing examples illustrate, embodiments of the invention may improve the operation of a computing system, or element of a computing system, and/or may facilitate resolution of one or more technological problems relating to testing, operation, and/or problem diagnosis and resolution, in computing systems, elements, and methods. Moreover, the solutions to such technological problems may be improved and refined over time using iterative processes, such as machine learning. Aspects of the disclosed processes and methods are discussed below in connection with various illustrative examples.

A. Aspects of an Example Operating Environment

The following is a discussion of aspects of example operating environments for various embodiments of the invention. This discussion is not intended to limit the scope of the invention, or the applicability of the embodiments, in any way.

At least some particular embodiments of the invention may be employed in connection with an IoT environment having one or more IoT edge components which may include, for example, IoT sensors, IoT actuators, and/or, any other IoT devices that collect and/or generate information and/or transmit information concerning the environment in which they are disposed, and the IoT environment may also include IoT devices that are responsive to commands to modify some aspect of their environment. To illustrate, IoT edge components include IoT sensors for physical security and disaster detection. Other IoT edge components include surveillance cameras, motion detection sensors and other edge devices that may be used to detect intruders and sound burglar alarms. Smoke and gas detectors may be used to trigger fire alarms and get extinguishers in action. Regardless of their configuration or intended use, IoT edge devices may also be configured to retrievably store data concerning their environment, operations, and/or commands received from an external system or device. Further details concerning an example operating environment in which IoT edge devices may be employed are provided below.

Where data protection operations, such as backup and/or restore operations, are performed, at least some embodiments may be employed in connection with a data protection environment, such as the Dell-EMC DataDomain environment, which can implement backup, archive, restored, and/ or disaster recovery, functions. However, the scope of the invention is not limited to this example data protection environment and extends, more generally, to any data protection environment in connection with which data is created, saved, backed up and/or restored.

The data protection environment may take the form of a cloud storage environment, an on-premises storage environment, and hybrid storage environments that include public and private elements, although the scope of the invention extends to any other type of data protection environment as well. Any of these example storage environments, may be partly, or completely, virtualized. The storage environment may comprise, or consist of, a datacenter which is operable to service read and write operations initiated by one or more clients.

In addition to the storage environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, filesystems, as well as databases such as Oracle databases, and SQL Server databases, for example. The applications on the clients may generate new and/or modified data that is desired to be protected.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

B. Aspects of an Example System and Associated Operating Environment

With attention now to FIG. 1, details are provided concerning an example operating environment 100 and an example implementation of a system 200 operable to detect a threat and take a preemptive action responsive to the detected threat. It should be noted that a system within the scope of the invention can include any combination of the example elements disclosed in FIG. 1. It will be appreciated that the disclosed components and associated functionalities can be combined together in any suitable fashion and, as such, the scope of the invention is not limited to the illustrative example of FIG. 1. Likewise, the functionalities disclosed herein can be allocated in any suitable manner among the components of FIG. 1 and, as such, the scope of the invention is not limited to the illustrative functional allocation of FIG. 1.

With particular attention now to FIG. 1, a system 200 may comprise an array 202 of one or more sensors 202a . . . 202n, one, some or all, of which may be IoT sensors. IoT sensors may alternatively be referred to as IoT edge sensors and embrace, but are not limited to, sensors, actuators or any other devices that produce information and/or are responsive to commands to control the environment they are in. As used herein, the term sensors embraces both sensors, such as those examples listed immediately below, and alarms, and sensors within the scope of this disclosure may operate automatically and/or may be manually activated. In general, the type, number, location, and combination, of sensors may be based on considerations including, but not limited to, the type(s) of threats most likely to be encountered, and the proximity of potential threat sources to the datacenter, and the amount of time needed to implement one or more preemptive actions once a threat has been identified.

Sensors that may be employed in connection with embodiments of the invention include, but are not limited to, fire and smoke detectors, gas detectors, leak and flooding detectors, humidity gauges, temperature gauges, seismometers, motion detectors, security cameras with automatic motion/threat detectors, burglar alarms, voltage and electric current detectors, pressure sensors, airflow meters, noise detectors, and chemical detectors and sensors. Other sensors within the scope of the invention may be manually activated, such as a manually activated fire alarm for example, or an intruder alert or panic button, as another example. The foregoing and/or other sensors can be employed in any combination, type, and number.

The sensors 202a . . . 202n can be employed in any location, or locations, where they are able to detect actual and/or potential threats to a datacenter. Example locations for one or more sensors include within the datacenter itself, within individual datacenter components, in buildings and/ or other facilities adjacent to the datacenter, in the outside environment around the datacenter, and in any other location where detection of a threat or potential threat at that location would provide adequate time for corresponding preemptive action(s) to be identified and taken.

The sensors need not necessarily be located in a close proximity to the datacenter itself. For example, preemptive operations can be started if there is a fire, for instance, on adjacent floors or in nearby buildings. Moreover, many disasters have a cascading effect, for example, fires are usually followed by power outages. Thus, even if the disaster were contained at a location remote from the datacenter and has not reached the datacenter itself, the datacenter might still be affected for a period of time.

As disclosed in FIG. 1, it can be seen that multiple groups of sensors may be employed. Thus, in addition to the sensor array 202, another sensor array 206 including sensors 206a and 206b may additionally be employed. In some embodiments, different sets of sensors are employed in different respective locations or environments, although that is not required.

With continued reference to the example of FIG. 1, embodiments of the invention may receive, process, and act upon, inputs from sources other than, or in addition to, sensors such as those examples included in the sensor arrays 202 and 206. To illustrate, threats such as large natural disasters like earthquakes, wildfires, tornados and tsunamis may not be readily detected by local sensors located in, or relatively close to, the datacenter. Thus, embodiments of the invention are configured to implement one or more preemptive actions based in part, or in whole, on one or more external triggers, information, or other content, received from one or more third parties.

National control centers, such as a weather service for example, that detect such events could send special notifications in these scenarios, and preemptive measures may automatically be applied by embodiments of the invention. Such special notifications may include, for example, information about any one or more of the specific nature of the threat, such as fire, flood, or wind for example, the expected impact of the threat to infrastructure, the estimated time of the expected impact, and any other information. Special notifications may also include information about civil unrest, such as riots for example, or other similar problems and events.

Other examples of external triggers include, but are not limited to, law enforcement agency notifications regarding physical breaches, and fire department notifications regarding fires that are in, or are expected to be, in the vicinity of the datacenter and/or areas of infrastructure, such as power plants or electric transmission towers for example, damage to which may affect datacenter operations and data. As a final example, other alarm systems in the vicinity of the datacenter, such as from a similar detection system in a nearby datacenter, can serve as an external trigger as well.

With continued reference to FIG. 1, the system 200 may optionally include one or more gateways, such as gateway 204 and gateway 208 for example. Any number 'n' of gateways may be used. In general, gateways refer to systems and/or devices configured to consolidate communication and management of multiple edge devices, such as the sensors in IoT sensor arrays 202 and 206, for example. Gateways may be employed where, for example, edge device networking capabilities are local in nature, whether with respect to power and/or connectivity, and the gateway is used by the edge devices to connect to the internet and/or to another communication network.

As shown, a gateway may be dedicated to a particular array or group of sensors, although that is not required. In the illustrated example, the sensor array 202 communicates by way of gateway 204, while the sensor array 206 communicates by way of gateway 208. Any of the connections between the elements shown in FIG. 1 may be wireless, or hardwired, connections. As also indicated, gateways such as gateway 204 and gateway 208 may be referred to as corresponding to respective layers, such as Layer 1 and Layer 'n,' for example. The layers may be layers in a communication configuration. Moreover, the gateway in the highest layer in a communication configuration, such as the gateway 208, may communicate with one or more other gateways at lower layers, such as the gateway 204. As well, the gateways may be arranged in series with each other, although that is not necessarily required and a parallel gateway arrangement could also be used. In the example illustrated configuration, the layer 'n' gateway 208 consolidates all communications from the lower layers, such as layer 1.

As further indicated in FIG. 1, data storage functionalities associated with the system 200 may be implemented by a datacenter 300. The datacenter 300 may include storage 400 that may comprise a database (DB) and/or data lake configuration, either or both of which may also be elements of a datacenter. More generally however, the storage 400 embraces any system and/or components operable to store data and respond to read and write requests. In more detail, the storage 400 may be used to save incoming data from the sensors in IoT sensor arrays 202 and 206, after that data has been processed by a processing server 500 which is able to communicate with the storage 400.

In general, the processing server 500 and/or other components may be programmed to receive sensor inputs in the form of data, such as by way of one or more gateways, and perform processing and/or analytics with respect to that sensor data. That is, the raw data provided by the sensors can be received and processed by the processing server 500. The processing server 500 may, but need not, be an element of the datacenter 300.

Processed and/or unprocessed data can be passed from the processing server 500 to a threat prediction engine 600 that may, or may not, reside at the datacenter 300. Among other things, the threat prediction engine 600 is able to receive and transmit data, to and from, the processing server 500 and storage 400. In general, the threat prediction engine 600 is configured, and operates, to identify and evaluate threats, and to implement, or cause the implementation of, one or more preemptive actions responsive to the threats. Examples of such threats include, but are not limited to, fire, flood, power outages, and gas or chemical leaks. Other examples of threats are disclosed elsewhere herein. The threat prediction engine 600 can then determine, based on the threat(s) identified, what, if any, preemptive actions should be taken with respect to the protection of the data protection environment with which the system 200 is associated. Once the preemptive actions have been identified, the threat prediction engine 600 may, on its own or in cooperation with other elements such as the processing server 500, then implement, and/or cause the implementation of, those preemptive actions.

To these ends, the threat prediction engine 600 may include a process/analysis module 602, and a threat library 604. The threat library 604 may include a table or other database or data structure that maps one or more preemptive actions to a particular threat. The process/analysis module 602 may receive raw sensor data, and then process the sensor data to identify corresponding preemptive actions. The process/analysis module 602 may also implement, or cause the implementation of, those preemptive actions, as well as control the performance, timing, and/or other parameters, of the preemptive actions.

The threat prediction engine 600 may operate in a feedback configuration with the sensor arrays 202 and/or 206 in which the processing server 500 continuously, or periodically, receives input from the sensor arrays 202 and/or 206, and then passes the input along to the threat prediction engine 600 which then implements, or causes the implementation of, any appropriate adjustments to the preemptive actions that are in process, and/or that are scheduled for implementation. For example, if a sensor gives false positive indication of a threat, a preemptive action in process, or scheduled, can be stopped, reversed, and/or canceled, by the threat prediction engine 600 if/when it is later determined that the sensor indication was a false positive. This functionality may also enable the troubleshooting and repair/replacement of faulty sensors, which may be useful inasmuch as it may help to avoid unnecessary implementation of possibly expensive and time-consuming preemptive actions.

The threat prediction engine 600 may communicate, and operate in connection, with any one or more components, which may or may not be datacenter components, to implement, and/or cause the implementation of, one more preemptive actions. Such components (not shown) may include, for example, databases, database servers, metadata servers, backup servers, backup systems, restore servers, restore systems, storage systems, storage disks, communication components and communication networks, memory devices, storage devices, climate control systems, power sources, power distribution systems, and/or any other components which may be operable to carry out a portion, or all, of a preemptive action.

In connection with the discussion of FIG. 1, it is noted that the functionality implemented by the system 200, storage 400, processing server 500, and threat prediction engine 600 need not be allocated as shown in that example configuration. More generally, such functionality can be allocated in any other suitable manner. Thus, for example, any one or more of the system 200, storage 400, processing server 500, and threat prediction engine 600 may be owned and/or operated by the same enterprise that operates the datacenter which includes that data and components that are to be protected, and some or all of the functionality of the aforementioned elements may be implemented at the datacenter 300, such as the processing performed by processing server 500. As another example, the functionality of the storage 400, processing server 500, and/or threat prediction engine 600 may be provided as a service, such as a subscriber service for example, to one or more clients, such as by a landlord or owner of a business park to its tenants. The foregoing are presented only by way of example and are not intended to limit the scope of the invention in any way.

With continued reference to FIG. 1, the system 200 may include a machine learning module 700 that is able to communicate, and transmit/receive data, with the processing server 500, database 400, and thread prediction engine 600. In general, and as discussed in more detail elsewhere herein, the machine learning module 700 is operable to perform a variety of processes which may help to generate a new/refined preemptive action plan. By way of brief introduction, the machine learning module 700 may perform an initial assessment, identify recovery actions and associated costs, perform an evaluation to identify preemptive actions that will minimize harm to the data while also minimizing the cost to implement those preemptive actions and, finally, perform or cause the performance of the recommended preemptive actions.

In the example configuration of FIG. 1, the machine learning module 700 is a stand-alone entity, but alternative configurations may be implemented. For example, the machine learning module 700 may be integrated into any of the database 400, processing server 500, or thread prediction engine 600. As well, the machine learning module 700 may receive IoT information directly from the IoT arrays 202 and 206, and/or by way of the processing server 500. The machine learning module 700 may, but need not, be an element of the datacenter 300.

Figure 1A:
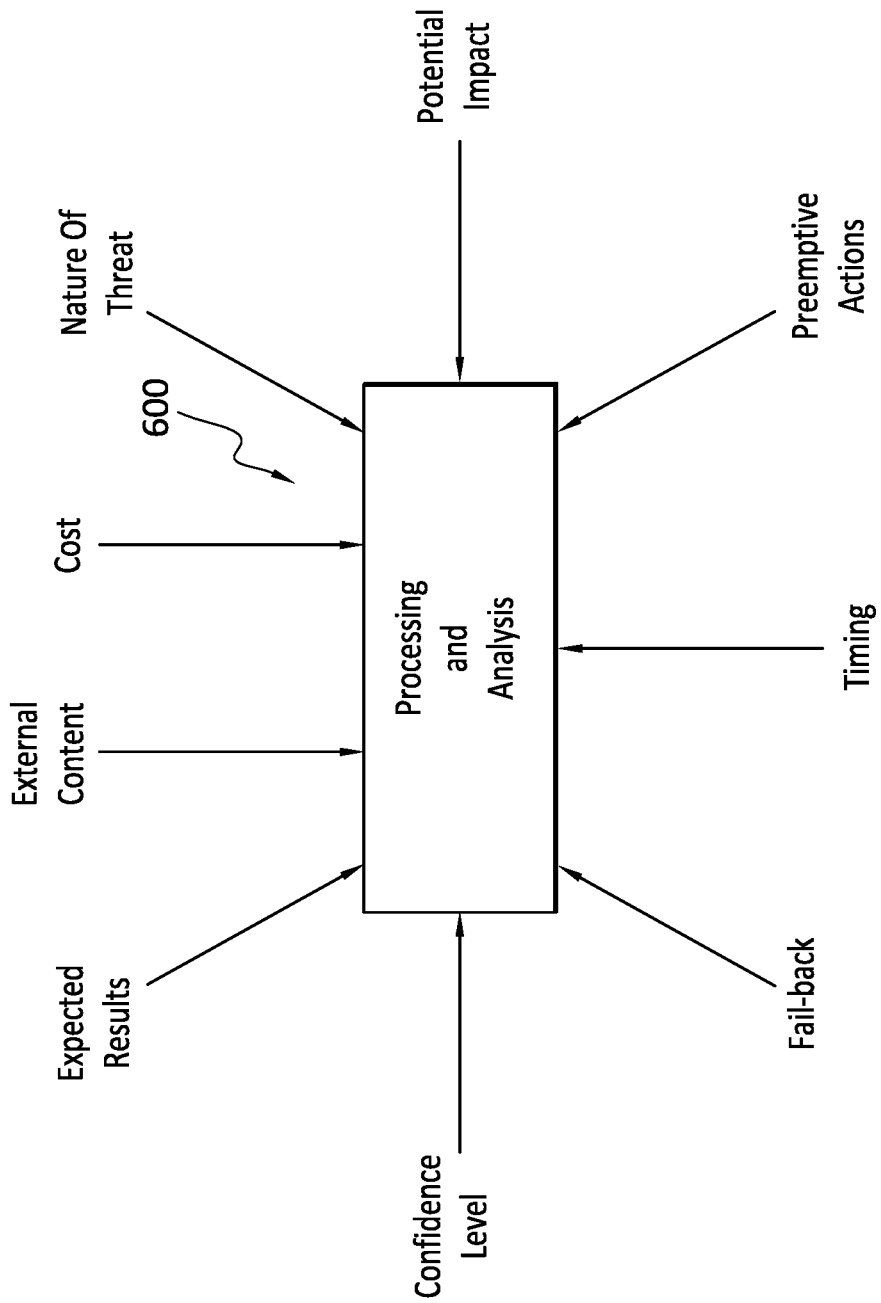
FIG. 1a discloses aspects of an example host configuration.

With continuing reference to FIG. 1, and directing attention now to FIG. 1a, further details are provided concerning aspects of the functionality disclosed herein. As shown in FIG. 1a, the processing and evaluation performed by, and/or at the direction of, the threat prediction engine 600 may consider and evaluate a variety of inputs in reaching a conclusion as to (i) whether or not to take a preemptive action; and (ii) what form any such preemptive action should take. Such inputs include, by way of example: the cost to implement a preemptive action; the nature of the threat identified; the potential impact in terms of costs and/or other considerations if the preemptive action is not taken; the nature of any preemptive actions that may be taken; the timing of any preemptive actions, that is, when such preemptive actions may, or should, be taken; the cost, in financial and time terms, of fail-back operations after the threat has passed, the confidence level that a perceived threat will materialize in such a way as to cause actual harm to the datacenter; the expected results of implementing, or not, a preemptive action responsive to the threat identified; and, external content, such as information about events from external sources such as law enforcement, fire departments, governmental agencies, and neighboring threat detection and analysis systems.

It should be noted that while the immediately preceding discussion of FIG. 1a refers to the threat prediction engine 600, any or all of the functionality attributed in that discussion to the threat prediction engine 600 may additionally, or alternatively, be performed by, and/or at the direction of, the machine learning module 700. Moreover, the machine learning module 700 may perform some or all of that functionality in cooperation with the threat prediction engine 600. As such, the functional allocation disclosed in connection with FIG. 1a is presented only by way of example, and the various disclosed functions can be allocated as between, at least, the threat prediction engine 600 and the machine learning module 700 in any other way as well.

C. Example Host and Server Configurations

Figure 2:
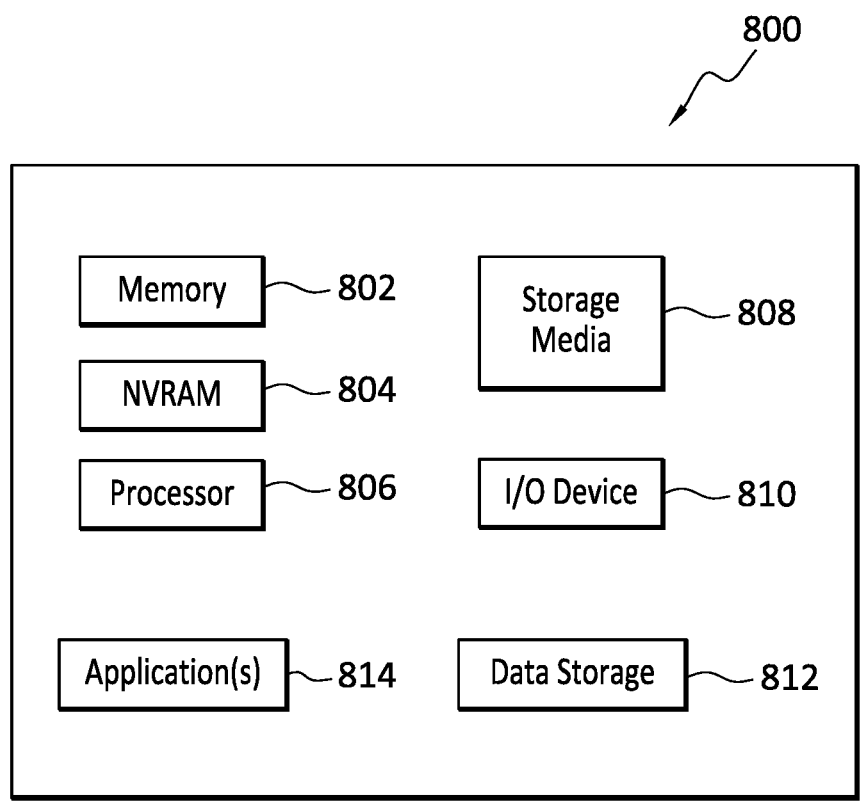
FIG. 2 discloses aspects of an example threat prediction engine that may be employed in some embodiments.

With reference briefly now to FIG. 2, any one or more of the IoT edge devices 202a . . . 202n, 204a . . . 204n, gateway 206, gateway 208, data center 300, storage 400, processing server 500, thread prediction engine 600, and machine learning module 700, can take the form of, or include, a physical computing device, one example of which is denoted at 800. As well, where any of the aforementioned elements comprise or consist of a virtual machine (VM), that VM may constitute a virtualization of any combination of the physical components disclosed in FIG. 2.

In the example of FIG. 2, the physical computing device 800 includes a memory 802 which can include one, some, or all, of random access memory (RAM), non-volatile random access memory (NVRAM) 804, read-only memory (ROM), and persistent memory, one or more hardware processors 806, non-transitory storage media 808, I/O device 810, and data storage 812. One or more of the memory components 1002 of the physical computing device can take the form of solid state device (SSD) storage. As well, one or more applications 814 are provided that comprise executable instructions. Such executable instructions can take various forms including, for example, instructions executable to perform any process, and portion thereof, disclosed herein.

In one particular example, the instructions are executable to perform a machine learning process.

D. Aspects of Machine Learning in a Preemptive Action Setting

With continued reference to the example of FIG. 1, it was noted herein that embodiments of the invention embrace, among other things, machine learning processes that may be used to improve the efficiency and effectiveness of processes for implementing preemptive actions for data protection and preservation. In general, as used herein, machine learning refers to a subset of artificial intelligence in the field of computer science that may use statistical techniques to give computers the ability to learn with data, that is, progressively improve performance of one or more particular tasks, without having been explicitly programmed to generate, or perform, the improved tasks.

Machine learning tasks may be classified into two broad categories, depending upon whether or not there is a learning signal, or feedback, available to the machine learning system. The first category of machine learning may be referred to as supervised learning. In this type of machine learning, the computing system is presented with example inputs and the desired corresponding outputs, given by a 'teacher.' The goal in this case is to learn a general rule that maps inputs to outputs. In special cases, the input signal may be only partially available, or the input signal may be limited to special feedback.

The second category of machine learning may be referred to as unsupervised learning. In this type of machine learning, no outputs are given to the learning algorithm. Instead, the learning algorithm is left to its own to find structure in the inputs that it receives. Depending upon the circumstances, unsupervised learning may be a goal in and of itself, that is, to discover hidden patterns in the input data. Unsupervised learning may additionally, or alternatively, be used to learn a general rule.

Having a wide variety of preemptive measures available may be important from a business perspective, at least, since the correct measure(s) can then be readily selected and implemented. For example, any number of different preemptive actions or measures may be desirable for each application in a datacenter. As a practical matter however, unless only a small number of applications are involved, it may not always be possible to manually decide which preemptive actions should be taken. Use of machine learning processes may thus be effective where the environment is complex and multi-faceted, since such machine learning processes may be automatically scaled as necessitated by the circumstances.

Another example of a circumstance where a machine learning approach may prove useful is where a preemptive action is taken, and corresponding costs incurred, based on the information available, only to be unnecessary when, for example, it turns out the preemptive action was taken based on a false-positive alarm. Not only is there a cost to implement the preemptive action, but there are also costs associated with returning to the normal state of operations. A machine learning approach to selecting and implementing preemptive actions may provide an automatic mechanism that can identify an acceptable balance between data/application availability on the one hand, and the consequences of too quickly/slowly implementing a preemptive action on the other hand.

As the foregoing examples, and the other disclosure herein, illustrate, a machine learning process for selecting and implementing preemptive actions is able to take into account past events, data, and other historical information, from any relevant circumstances and operating environments in order to improve decision making for data preservation and protection.

In general then, when a threat to data security and/or availability is perceived, embodiments of the invention are able to perform a set of actions respecting, for example, datacenter servers and applications, that will mitigate the risks to the enterprise. As such, example embodiments of the invention evaluates the circumstances, calculates the costs and benefits of various actions, or groups of actions, and then identifies a recommended set of actions to be performed. In at least some embodiments, part, or all, of the aforementioned process is performed automatically, such as in response to a trigger for example. The trigger may be an event or condition detected by a sensor. Finally, example processes embraced within the scope of the invention may run in an iterative manner, taking into account the effects of previously implemented actions, as well as new data generated by one or more sensors.

E. Aspects of Preemptive Measures in Machine Learning

Figure 3:
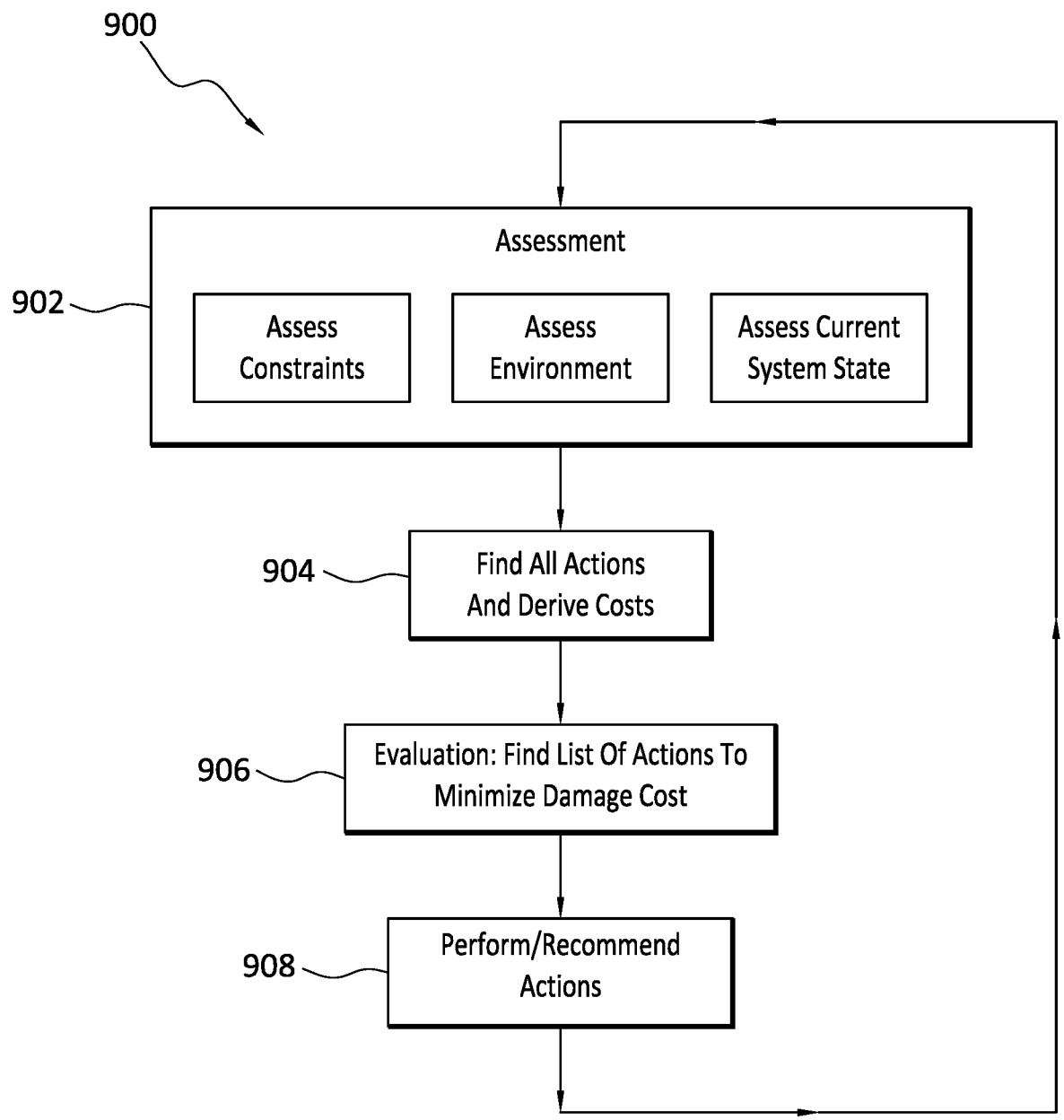
FIG. 3 is a flow diagram that discloses aspects of an example machine learning method in accordance with various embodiments of the invention.

With the foregoing discussion in view, and directing attention now to FIG. 3, details are provided concerning some example methods for IoT-triggered preemptive measures for machine learning. In general, one or more of such example methods may involve definition of a set of actions, A1 . . . An representing various example operations that can be performed on a system at a given time. To illustrate, the following example actions may be defined: 1. A1=perform failover on application #15 to remote location C; 2. A2=shut down server of application #21; and 3. A3=set level of compression to MEDIUM in application #7, so as to control the balance between CPU and bandwidth. In an iterative machine learning process, a system will evaluate the state, choose a set {A1} of actions to perform, and move to the next iteration. FIG. 3, discussed below, discloses one example machine learning algorithm, denoted generally at 900.

In the illustrated example, the method 900 may involve four stages, namely, assessment, identification of actions and derivation of costs, evaluation, and implementation of recommended actions. In alternative embodiments, more, or fewer, stages may be employed. As well, the method 900 may be performed iteratively, where the time between iterations can be set by a user. In one example embodiment, the time between iterations may be about 5 minutes, but longer or shorter times may be used.

Some, or all, of the method 900 may be performed by a machine learning module, although that is not necessarily required. In some embodiments, the machine learning module may, but is not required to, operate in conjunction with a processing server and/or a threat prediction engine. For example, the machine learning module may receive processed or unprocessed sensor information from the processing server. As another example, the machine learning module may receive threat related information from the threat prediction engine.

The method 900 can begin when an assessment is performed 902. As part of, or preliminary to, the assessment stage, an evaluation of the state of the environment is performed. This evaluation may be based at least in part on sensor data and may include, for example, determining what is happening in the environment and what conditions are present in, or absent from, the environment.

The assessment may be focused on a small number of considerations, or may be relatively comprehensive. In the example of FIG. 3, the assessment 902 involves an assessment of constraints, the environment, and the current state of the system. Some, or all, parts of the assessment 902 may be performed iteratively. Information considered at the assessment stage 902 may be real time information and/or may be historical information obtained from a database or storage. Following are some examples of systems, devices, and states, that may be considered at the assessment stage 902.

One element of the assessment stage may include an assessment of alarms generated by one or more IoT devices. This information may be received by the machine learning module directly from sensors and/or indirectly by way of the processing server and/or threat prediction engine. The IoT alarm information may be considered in conjunction with an estimated time of impact for the perceived threat, where this estimated time of impact and/or the nature of the perceived threat maybe generated by the threat prediction engine and fed to the machine learning module.

Another example element of the assessment stage may involve an enumeration or identification of entities potentially, and/or actually, impacted by one or more events. Such entities may be hardware, software, and combinations of hardware and software. Example entities include, but are not limited to, servers, applications, storage devices, replication engines, data protection software including backup and restore applications, and any other entity that may be, and/or has been, adversely affected by an event. As part of the identification of entities, embodiments of the invention may also assess the respective states of those entities such as, for example, whether or not an application is running.

A further example element that may be considered at the assessment stage includes assessment of constraints and the availability of resources. Some example constraints include total maximum bandwidth and available bandwidth. Bandwidth information may be used in determining, for example, how quickly threatened data can be copied to a remote node. That is, relatively more bandwidth would permit the threatened data to be copied relatively quickly to a remote node. This information, in turn, may be used to inform the timing of particular actions. That is, low available bandwidth may require that such a replication process be undertaken relatively sooner than if relatively more bandwidth were available. Bandwidth information may also inform prioritization of backups of different applications. For example, available bandwidth may dictate that not all applications can be backed up at once, such that some applications must be prioritized over others, and a similar analysis may be performed for data as well. Another example of a constraint that may inform the implementation of an IoT preemptive measure is the number of remote sites that may be available to receive and store a replica of threatened data.

Some further additional examples of items to be considered at the assessment stage 902 include connectivity, that is, whether and to what extent various systems and devices are connected for communication. A further example of such an item is the extent to which electrical power is available to run various processes.

As the discussion of stage 902 suggests, a wide variety of different items may be considered at the assessment stage 902. In general, any item or consideration that relates in any way to a threat, and/or to threatened data, may be evaluated and considered at the assessment stage 902.

After the assessment stage 902 has been completed, the method 900 may move to 904 where potential recovery actions, and associated costs, are identified. In one example implementation, the identification stage 904 may involve finding, for each entity in an environment, which may be a data protection environment for example, possible recovery actions that may be performed. Note that what constitutes a particular environment can be identified ad hoc by a user. For example, an environment may be defined as comprising, or consisting of, one or more entities specified by the user. One, some, or all, of the entities in such an ad hoc environment may be members of a data protection environment, but that is not necessarily required. As well, the ad hoc environment may constitute only a portion, or less than all of, a data protection environment or other environment. Through the use of such ad hoc environment definition, the scope of the environment can be narrowed to eliminate entities, and corresponding actions, that need not be considered in a particular real world situation or hypothetical scenario. The scope of the invention is not limited to environments of any particular size, nature, or scope.

With continued reference to the identification stage 904, identification of possible recovery actions may be performed automatically, according to the version, as in the case of known applications for example. The recovery actions may, for example, be common to multiple entities. For example, a 'shut down server' recovery action may apply to one, some, or all applications in a system. In some embodiments, the possible recovery actions for one or more entities may be obtained from the entity itself, or from another source. Thus, in one example embodiment, one or more recovery actions may be identified from an entity such as a data protection system. In this, and/or other, embodiments, the recovery action(s) identified may be specific to a particular entity or subset of entities.

As part of the identification of potential recovery actions 904, an evaluation or query may also be performed to determine the feasibility of implementing any identified recovery actions. To illustrate, one recovery action might be 'transmit snapshot to remote node.' However, if a query reveals that adequate bandwidth may not be available to support transmission of the snapshot, then this particular action may be eliminated from a list of possible recovery actions. As another example, such a query may also be used to determine if adequate bandwidth is, and/or will be, available to support the operation of a failover application.

When the various possible recovery actions have been identified, and as part of the identification stage 904 for example, a list A1 . . . An may then be created that includes the identified recovery actions. For each listed action A, the impact of implementing that action may then be assessed and associated with the respective action. An assessment may involve determining what other resource(s) may be affected by implementation of the recovery action. Thus, for example, if a recovery action of shutting down a server is identified, an assessment may be made of the impact that the server shutdown would have on applications running on, and/or otherwise utilizing, that server.

As another example of an assessment process, the impact of the performance of a recovery action on a finite resource, such as data transmission/communication bandwidth, may be determined. That is, the bandwidth requirement associated with a potential recovery action may be identified. The impact in this case would be that the available bandwidth for other operations, which may or may not be other recovery actions, would be decreased. In some embodiments, the amount of bandwidth available may dictate that an alternative approach be employed for one or more recovery actions. Thus, for example, if the bandwidth will not support synchronous replication, the recovery action may take the form of asynchronous replication instead.

The aforementioned and/or other assessment processes may also involve identify and resolving conflicts between or among two or more possible recovery actions. To illustrate, one recovery action may be to shut down a server, while another recovery action may be to create snapshots of the applications on that server. However, if the server is shut down, the snapshots cannot be created. Thus, there is a conflict between the two recovery actions that must be resolved. One way to resolve the conflict is to prioritize one of the recovery actions over the other so that one recovery action is performed but the other is not. Alternatively, the recovery actions can be performed in sequence, if possible so that, for example, the snapshots are taken before the server is shut down. Still another way to resolve the conflict is to identify one or more alternative recovery actions and/or simply not perform either of the initially identified recovery actions.

As another element of the identification stage 904, information such as costs, and damage measures, for example, may be associated with one or more respective identified recovery actions. The association or assignment of such information to recovery actions can be used to help determine the prioritization of the performance of various recovery actions. For example, if insurance does not cover some assets, it may be desirable in some circumstances to place a relatively higher priority on the implementation of a recovery action concerning those assets. As another example, applications may be prioritized for recovery actions in advance and, as such, recovery action(s) will first be performed with regard to relatively higher priority applications, and later, or not at all, for relatively lower priority applications. Performance of recovery actions can be prioritized on other bases as well.

To illustrate, performance of identified recovery actions can be prioritized based on contractual requirements, such as the level of service required by a service level agreement (SLA) to be provided by a data protection enterprise. For example, if one SLA required that data losses for an enterprise be limited to 2 hours, the recovery action(s) relating to that enterprise may be performed sooner and/or relatively more quickly than for an enterprise whose SLA indicates that 1 day of data loss is acceptable. Additionally, or alternatively, priorities for recovery actions may be specified within a single SLA. For example, an SLA may specify that application snapshots are relatively more important than backups of data that is more than 1 year old. As such, recovery actions relating to the snapshots addressed by that SLA may be performed sooner and/or relatively more quickly than for backups of old data specified by that SLA. Yet another way to prioritize the implementation of recovery actions concerns costs, which can be measured in various ways including, but not limited to, monetary costs, application downtime, and lost data.

Moreover, costs, whatever their form, may implicate other costs. For example, downtime of an online store, which is one example of a cost, may result in lost sales. As well, the downtime of the online store may also cause unfavorable publicity, which may lead in turn to additional lost sales.

In general, recovery actions can be implemented according to the costs, however measured, expected to be incurred if those recovery actions were omitted. Thus, if the cost associated with a failure to create an application snapshot is greater than the cost that would be incurred if archived data were not copied to a remote node, the application snapshot would be a relatively higher priority recovery action than copying of the archive data and, as such, might be performed relatively sooner and/or faster than the archive data copying.

Where monetary costs are used as a basis for establishing priorities, the monetary cost information may be obtained, and/or derived, from a variety of sources. For example, the monetary cost information can be obtained from predefined entries associated with respective recovery actions, from past experience, and/or from similar situations that have occurred in other locations or organizations. In some embodiments, expected costs, of any type, may all be normalized to a financial impact, such as cost in US dollars (USD). However, whether or not normalized to a particular common reference scale, such as type of impact, costs can be measured in any other suitable way as well.

After the identification stage 904 has been completed, an evaluation stage 906 may be performed in which, among other things, processing of the identified recovery actions may be performed. For example, at this evaluation stage 906, the list of recovery actions may be evaluated to identify combinations of recovery actions that: do not contradict each other; and, can be performed within a specified time frame. When such combinations, if any, have been found, a further evaluation can be performed to identify which combination has the least aggregate cost to implement. As well, the recovery actions and/or costs can be mapped to the benefits expected to be achieved if the recovery actions are implemented. As with the costs, the benefits can be normalized to a common standard. The benefits can be measured in any suitable terms, such as, how quickly data and/or applications can be restored. To illustrate, and all other things being equal, if an application can be restored in 4 hours at a cost of $1000, or in 5 hours at a cost of only $500, the additional 1 hour benefit may, or may not, justify the doubling of the cost. In any case however, this example illustrates that the choice of a recovery action need not be based only on cost, but may also take into account the relative benefit(s) associated with the costs that would be incurred.

With continued reference to FIG. 3, the example method 900 may further include an implementation stage 908. In general, at the implementation stage 908, one or more recovery actions may be recommended and/or implemented. One or more recovery actions may be implemented automatically and/or a system or component such as a machine learning module may provide recommendations to a user, such as a human administrator, who can then select, and initiate implementation of, one or more recovery actions. In connection with stage 908, one or more recovery actions may be monitored during their implementation, and modified, canceled, or rolled back, depending upon the occurrence, or non-occurrence, of other events in the system. Information concerning such other events relating to a recovery action may be received, such as at a machine learning module or processing server, from a variety of sources, examples of which include, but are not limited to, IoT edge sensors, examples of which are disclosed herein. When stage 908 is completed, the system may wait for a period of time, which may be any period of time and may be set by a user in some embodiments, and then return to stage 902, although iteration of the method 900 is not necessarily required.

Various actions may be performed as part of the method 900 and/or between iterations of the method 900. Examples of such actions include, but are not limited to: reallocating resources when a recovery action has been completed, stopped, or rolled back; reevaluating the state of the system(s) in connection with which the method 900 is being performed; identifying recovery action(s) completed and/or remaining to be performed; and, stopping and/or rolling back recovery actions, such as if a recovery action is no longer needed to be performed.

As demonstrated by the examples disclosed herein, example embodiments of the invention implicitly insert complicated logical decisions and evaluations into a machine learning algorithm that may be performed iteratively, and which may be modified, canceled, or rolled back, on-the-fly as recovery actions are being performed. Embodiments of a machine learning process for identifying and implementing recovery actions may enable administrators and other users to learn, for example: recovery actions that should be performed; recovery actions that are not necessary and can be safely eliminated from consideration; the cost of operations and damages, including the cost of undoing a recovery operation in case of false positives; the time it takes to perform recovery actions; combinations of operations that work well or actions that contradict each other; the order in which recovery actions or operations should be performed—for example, do flushes, such as cache flushes, first and failover later, so as to decrease the search space for future algorithm runs, and thus enabling the algorithm to run faster; and, the time estimate for impact according to input from IoT sensors—for example, how much time it takes for a fire detected at a certain distance to hit a datacenter.

Such information may be learned using supervised learning or unsupervised learning. Supervised learning may be based upon any one or more of, previous runs in the operating environment, performance of system simulations, experience from other datacenters with similar applications, similar IoT sensors, and related verticals in the industry. In supervised learning embodiments, inputs may be received from a subject matter expert on how well the algorithm performed. In unsupervised learning embodiments, subject matter expert input may be omitted, and unsupervised learning processes may rely only on the system state. In some embodiments, the results generated by an unsupervised machine learning process may be compared with the results of a supervised machine learning process. One or both of these two processes may then be modified based on the comparison.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:
1. A system, comprising:
one or more hardware processors; and
a computer readable storage medium having stored therein instructions that are executable by the one or more hardware processors to perform operations comprising:

performing a machine learning process that comprises the following operations:

performing an assessment of a physical environment within which a data storage system of a datacenter is located, wherein the assessment includes analyzing information generated by an IoT edge sensor in response to a sensed physical condition of the physical environment, and the sensed physical condition is not associated with any particular component or components of the data storage system;

identifying one or more preemptive recovery actions and associating the one or more preemptive recovery action with the data storage system, and one of the preemptive recovery actions reduces or eliminates an impact of an event, associated with the sensed physical condition, on the data storage system;

determining a respective cost associated with implementation of the one or more preemptive recovery actions;

evaluating the costs associated with the one or more preemptive recovery actions and identifying the preemptive recovery action with the lowest associated cost; and protecting and preserving data that is stored in the data storage system of the datacenter by implementing, or enabling the implementation of, the preemptive recovery action with the lowest associated cost.

2. The system as recited in claim 1, wherein the data storage system comprises computing system hardware and/or software.

3. The system as recited in claim 1, wherein the operations further comprise evaluating the one or more preemptive recovery actions and identifying a preemptive recovery action that does not conflict with other preemptive recovery actions, and which can be performed within a specified timeframe.

4. The system as recited in claim 1, wherein when a conflict is identified between two or more preemptive recovery actions that have been identified, the operations further comprise resolving the conflict.

5. The system as recited in claim 1, wherein implementation of the one or more preemptive recovery actions is performed automatically without intervention or input by a human user.

6. The system as recited in claim 1, wherein repeating part of the machine learning process comprises repeating the performance of an assessment of the state of the data storage system.

7. The system as recited in claim 1, wherein the machine learning process is an unsupervised machine learning process.

8. The system as recited in claim 1, wherein the machine learning process is a supervised machine learning process.

9. The system as recited in claim 1, wherein the operations further comprise determining an impact on the data storage system of implementation of the preemptive recovery action.

10. The system as recited in claim 1, wherein one or more of the costs comprises an expected financial cost.

11. The system as recited in claim 1, wherein one or more of the costs comprises a cost expressed in an expected downtime of an application and/or downtime of a system.

12. The system as recited in claim 1, wherein one or more of the costs comprises a cost expressed in a type, and/or amount, of data expected to be lost.

* * * * *